March 26, 1957 R. COLOMBO 2,786,264
PROCESS AND DEVICE FOR PROTECTING THE JOINTS OF METAL
PIPES COATED WITH MULTI-LAYER PROTECTING
THERMOPLASTIC LININGS
Filed Oct. 6, 1953 2 Sheets-Sheet 1

United States Patent Office 2,786,264
Patented Mar. 26, 1957

2,786,264

PROCESS AND DEVICE FOR PROTECTING THE JOINTS OF METAL PIPES COATED WITH MULTI-LAYER PROTECTING THERMOPLASTIC LININGS

Roberto Colombo, Turin, Italy, assignor to S. A. S. Lavorazione Materie Plastiche (L. M. P.) di M. I. Colombo & C., Turin, Italy Application October 6, 1953, Serial No. 384,480

Claims priority, application Italy October 8, 1952

5 Claims. (Cl. 29—401)

This invention relates to the protection of welded sections of pipes whose coatings may be damaged during welding processes.

The use of iron and steel pipes for the transportation of pressure gases or liquids necessitates an adequate protection of these pipes against the corrosive action of the ground.

Metallic pipes employed for high pressure lines are connected by socket joints or butt joints and electric welding. In any case the portions of the joint to be welded together are heated to high temperatures, whereby the thermoplastic material of the pipe lining is destroyed in proximity to the welding region.

The invention provides a protection for the joint region, with a view to re-establishing continuity of the layers of the thermoplastic pipe lining.

Before effecting welding, a sleeve of thermoplastic material made up of superposed layers, equalling in number the layers of different materials forming the pipe lining is placed on one of the pipe sections to be welded. The diameter of the sleeve of thermoplastic material is such that the sleeve can be displaced on the coated pipe and the materials forming the various layers of the sleeve are the same as the materials from which the layers of the pipe lining are made. The thermoplastic sleeve protecting the joint can be manufactured during coating of the pipe.

Upon completion of the welding of the pipe sections, the section of the protecting lining injured by heating is removed. The protecting layers are thereupon cut along staggered lines. More particularly, the inner layers are cut nearer the welding line than the outer layers.

The thermoplastic sleeve fitted on the pipe is successively disassembled into its various layers, which are cut to a length equalling the spacing between the ends of the layers of the pipe. The various layers of the thermoplastic sleeve are sealed between the corresponding layers of the protecting lining thereby re-establishing continuity of the pipe lining.

Figure 1:
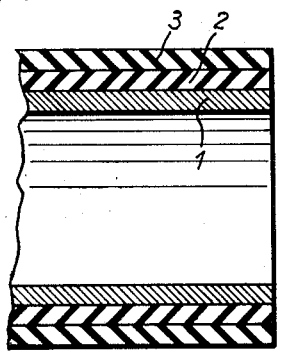
Figure 1 is an axial sectional view of a metal pipe end provided with a lining.
Figure 2:
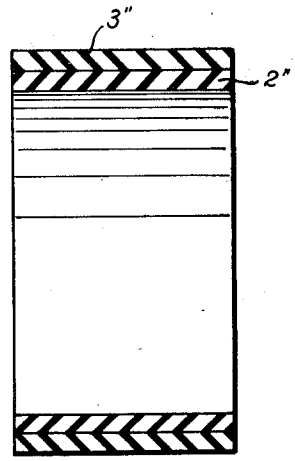
Figure 2 is an axial section of the thermoplastic sleeve used for protecting the joint.
Figure 3:
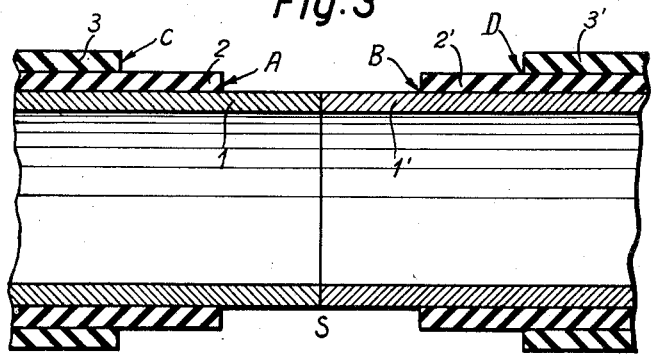
Figure 3 shows two welded pipes after welding and removal of the portions of the lining injured during welding.
Figure 4:
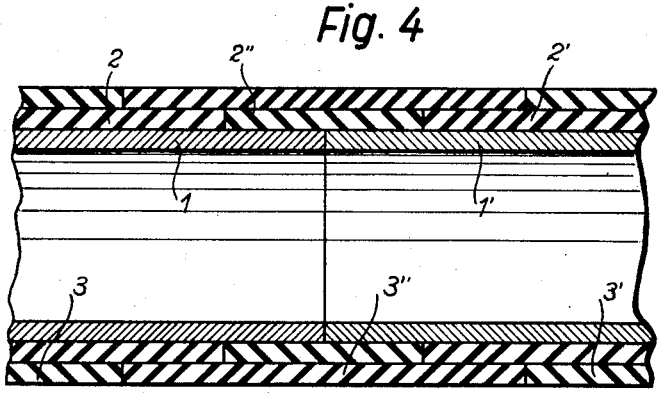
Figure 4 shows a pipe after butt welding with sleeve of the thermoplastic material affording a continuity of the protecting lining.

1, 1' denote two pipe sections butt welded along the line S (Fig. 3). 2, 3, 2' and 3' denote the layers of the lining on the pipes. A sleeve of thermoplastic material (Fig. 2) made up of two layers 2", 3" of the same material as the two layers 2, 3 is fitted on the pipe 1 before welding. Upon completion of welding the pipe lining is removed in the manner shown in Figure 3, more particularly, the inner layer is removed between the points A and B and the outer layer is removed between the points C and D. The inner layer 2" of the thermoplastic sleeve is removed from the layer 3" and cut to a length equalling the spacing between the points A and B. Moreover, it is cut along a generatrix so as to form a lining which tightly adheres to the pipe. The layer 2" of the sleeve is then welded to the layers 2, 2' on the pipes and along the generatrix on which the sleeve has been cut. The same process is followed in respect of layer 3 and any further layer of the sleeve.

Sealing of the sleeve elements to the layers of the pipe lining can be carried out in any suitable manner with or without the use of solvents.

The joint can be protected, without departing from the scope of this invention, by replacing the sleeve fitted on the pipe, by plates of thermoplastic material wound on the pipe at the joint and successively welded to the layers of the protecting lining of the pipe.

Figure 5:
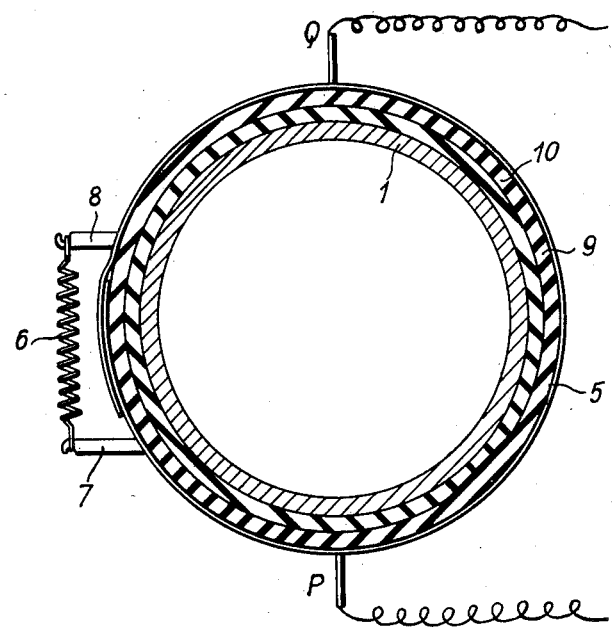
Figure 5 shows a device for electrically welding the protecting lining for the joint to the pipe lining.

A device for welding together the layers of thermoplastic material at the joint section which has been found more particularly useful, is shown in Figure 5 and comprises a metallic collar of which the ends can be superposed; this collar being kept close to the thermoplastic sleeve by a spring. Two terminals are placed on the collar for supplying thereto an electric current from any suitable source.

Figure 5 shows the manner of using the above collar. The thermoplastic layer 9 shall be welded to the layer 10 on the metallic pipe 11 for re-establishing continuity of the protection at the joint. Upon placing the thermoplastic layer 3, on the layer 2", the layers 3", 2", 3 and 3' are brought close by means of the collar 5 of which the ends can be superposed, the collar being pressed against the thermoplastic layer 9 by spring 6, of which one end is fastened to a support 7 attached to the collar, the other spring end being held by a hook provided at the end of a support 8 likewise secured to the collar. Once the collar 5 is fixed on the thermoplastic layer 9, the two terminals P and Q are connected to a source of current, thereby heating the joint, the thermoplastic material of the superposed layers 9 and 10 reaching a temperature high enough for welding them together.

What I claim is:

1. A method of protecting welded joints of metal cylinders coated with a plurality of layers of synthetic material, comprising fitting over the layers of synthetic material on the end of one of the cylinders to be joined a sleeve of synthetic material comprising a plurality of component layers of the same kind as the layers forming the protecting coating on the cylinders, joining the adjacent ends of the cylinders by welding, removing the damaged portion of the protecting coating from the cylinders at the welding region, separating said sleeve into its component layers, cutting said layers along their generatrices, and welding each of said component layers under constant pressure to the corresponding layers of the protecting coating for the cylinders so as to establish the continuity of said layers, the length of each layer of the protecting coating on each cylinder to be replaced being smaller than the length of the next successive larger diameter layer.

2. A method of protecting welded joints of metal cylinders coated with a plurality of layers of synthetic material, comprising fitting over the layers of synthetic material on the end of one of the cylinders to be joined a sleeve of synthetic material comprising a plurality of component layers of the same kind as the layers forming the protecting coating on the cylinders, joining the adjacent ends of the cylinders by welding, removing the damaged portion of the protecting coating from the cylinders at the welding region, separating said sleeve into its component layers, cutting said layers along their generatrices, and welding each of said component layers under constant pressure to the corresponding layers of the protecting coating for the cylinders so as to establish the continuity of said layers, the welding between the protecting layer of the cylinders and its corresponding protecting layer being affected by heating.

3. A method of protecting welded joints of metal cylinders coated with a plurality of layers of synthetic material, comprising fitting on the end of one of the cylinders to be joined a sleeve of synthetic material comprising a plurality of component layers of the same kind as the layers forming the protecting coating on the cylinder, joining the adjacent ends of the cylinders by welding, removing the damaged portion of the coating from the joined ends of the cylinders at the welding region wherein the innermost layer of the coating is removed over an axial length smaller than the removed axial lengths of the larger diameter layers, disassembling the sleeve to its component layers, adjusting the length of each layer to the length of the removed portion of the corresponding layer of the coating, successively welding each of said component layers under constant pressure to the corresponding layers of the coating by heating the welding region so as to establish continuity of the coating layers.

4. A method of protecting welded joints of metal cylinders coated with a plurality of layers of synthetic material comprising joining the adjacent ends of the cylinders by welding, removing the damaged portions of the coating from the joined ends of the cylinders at the welding region, adjusting the lengths of curved sheets of synthetic material of the same kind as that removed to the lengths of the removed portions, and welding each of said sheets under constant pressure to the corresponding layer of the coating by heating the welding region so as to establish the continuity of the coating layers.

5. A device for welding a layer of thermoplastic material adhering to a pipe and tube to a layer of thermoplastic material of the same kind arranged to protect a joint, comprising a metallic collar of which the ends can be superposed, means for heating said collar to the desired temperature for welding the underlying layer of thermoplastic material, and spring means for exerting a constant pressure during welding on the layer of thermoplastic material.

References Cited in the file of this patent
UNITED STATES PATENTS

| | | |
|---|---|---|
| 1,321,462 | Line | Nov. 11, 1919 |
| 1,704,413 | Wait | Mar. 5, 1929 |
| 2,161,036 | Gremmel | June 6, 1939 |
| 2,629,354 | Gay | Feb. 24, 1953 |

OTHER REFERENCES

"Repairing Reinforced Plastics," pages 99–102, Modern Plastics, February 1952.

"Plastic Pipe Patches," page 96, Modern Plastics, October 1952.